3,074,987
PROCESS FOR THE CONVERSION OF HALOGENOUS ORGANIC ALUMINIUM COMPOUNDS INTO HALOGENOUS ALUMINIUM COMPOUNDS HAVING DIFFERENT HYDROCARBON RADICALS

Karl Ziegler, Roland Köster, and Wolf Rainer Kroll, Mulheim (Ruhr), Germany; said Köster and said Kroll assignors to said Karl Ziegler, Mulheim (Ruhr), Germany
No Drawing. Filed Mar. 9, 1960, Ser. No. 13,715
Claims priority, application Germany Mar. 16, 1959
9 Claims. (Cl. 260—448)

This invention relates to a process for the conversion of halogenous organic aluminum compounds into halogenous aluminum compounds having different hydrocarbon radicals.

A process for the conversion of halogenous organic aluminum compounds into halogenous aluminum compounds having different hydrocarbon radicals was already suggested, in which process an organic aluminum compound of the general formula $XAlR_2$ wherein X is a halogen and preferably chlorine and R is a hydrocarbon radical which contains no triple bonds and is free from double bonds on the carbon atoms bonded to the aluminum atoms, is reacted with an olefin in the presence of an aluminum compound selected from the group consisting of aluminum compounds which have three valencies bonded to carbon, alkyl aluminum hyrides and aluminum hydride. Particularly important starting materials in this process are the dialkyl aluminum halides.

It has now been found that not only the free dialkyl aluminum halides but also complex compounds thereof with potassium halides of the general formula $KAlR_2X_2$ wherein X is chlorine or bromine but not iodine or fluorine can be reacted with olefins in the presence of the above-mentioned aluminum compounds having three valencies bonded to carbon or of aluminum alkyl hydrides or aluminum hydride.

In accordance with the invention, the starting complex compounds $KAlR_2X_2$ can be converted by the action of an olefin into different compounds of the same structure but having changed alkyl groups, as it was known hitherto for those aluminum compounds only which have all of the three valencies bonded to carbon. Thus, the process of the invention permits the formation of higher aluminum-organic compounds by reacting compounds of the general formula $KAl(C_2H_5)_2Cl_2$ with ethylene. In this process, pressures in excess of 10 atmospheres are used and the preferred temperatures are between 90° and 170° C. In this growth or addition reaction, the quantity of the ethylene to be reacted in accordance with the invention is substantially unlimited, it being possible either to use a few mols of ethylene per mol of aluminum compound thereby forming reaction products which contain still rather low molecular weight alkyl radicals such as butyl, hexyl or octyl radicals, or to use more ethylene thereby forming compounds which have very long-chain radicals on the aluminum. As by-products, there are obtained olefins, the quantity of which may, however, be restricted when preventing the reaction temperatures from increasing to levels substantially above 150° C.

In accordance with another embodiment of the process of the invention, complex compounds of the general formula $KAlR_2X_2$ wherein R is a radical higher than ethylene can be reacted with ethylene of, for example, atmospheric pressure thereby obtaining olefins other than ethylene in addition to lower or higher homologues of the starting materials.

It is to be understood, of course, that the complex compounds can be treated with olefins other than ethylene and preferably with low molecular weight olefins. In this case, the olefin corresponding to the radical R is obtained as the end product in addition to a lower or higher homologue of the starting compound $KAlR_2X_2$.

When complex compounds higher than the starting compound $KAlR_2X_2$ have been formed by reaction with ethylene, olefins can be split off from these higher complex compounds by increasing the reaction temperatures to more than 170° C. This cleavage may be promoted by adding different olefins. In case of this displacement by low molecular weight olefins, especially ethylene, it is possible to obtain the higher olefins bonded by addition in form of hydrocarbon radicals to the aluminum atom of the complex compound. This displacement may be catalyzed in known manner by catalysts such as nickel, cobalt or platinum as disclosed in German Patent No. 1,034,169.

In accordance with the invention, the quantities of the aluminum compound which has three valencies bonded to carbon or of the alkyl aluminum hydride or of the aluminum hydride are very small and generally range between 1 and 5%. This quantity is dependent upon the purity of the olefin used, certain impurities reacting with the aluminum trialkyls added as catalysts thereby rendering them ineffective. Therefore, higher quantities of catalyst must be used if necessary, depending upon the degree of purity of the olefins.

It is frequently necessary to inactivate the catalyst employed. This may be done by any reaction in which one of the three aluminum-carbon linkages is converted into a linkage other than the aluminum-hydrogen linkage, e.g. by reacting the aluminum trialkyl with an aluminum halide, aluminum alkyl dihalide or aluminum alkyl sesquihalide.

In a particularly advantageous embodiment of the process mentioned in the beginning, a higher dialkyl aluminum chloride is built up from diethyl aluminum chloride with ethylene in the presence of aluminum triethyl, and this higher dialkyl aluminum chloride in turn gives higher olefins with re-formation of diethyl aluminum chloride by the action of ethylene and under the catalytic action of nickel. Processing of the mixture of diethly aluminum chloride and higher olefins is effected by adding potassium chloride, which results in a mixture of the complex compound $K[Al(C_2H_5)_2Cl_2]$ with the higher olefins. The olefins are distilled off under vacuum and the complex compound is heated with ethyl aluminum dichloride in a molar ratio of 1:2 thereby forming diethyl aluminum chloride which is distilled off from the concomittantly formed solid and sparingly soluble potassium aluminum ethyl trichloride which in turn may be re-converted with aluminum chloride to form monoethyl aluminum dichloride and potassium aluminum tetrachloride.

It is this point where the process of the invention may be applied with great advantage. It permits in fact to build up again the formed complex compound with ethylene to form higher complex compounds without the necessity of previously setting the diethyl aluminum chloride again free from the complex compound.

It was found that the separation of the olefins from the complex compound can be effected more conveniently than by distillation. The potassium chloride complex compound of diethyl aluminum chloride spontaneously separates from the olefins by forming the lower layer on which the olefins are floating. As was found, an extensive self-purification of the lower layer from admixed colloidal nickel takes place during the stratification, this nickel passing into the upper olefin layer as the two layers are formed, and the lower layer comprising the complex compound is largely free from nickel. Residual traces of nickel may be deactivated by heating the complex compound several hours at 150° to 200° C. with exclusion of air. It may then be re-used for the reaction with ethylene.

Thus, a substantial simplification of the procedures as compared with the prior art process mentioned above is obtained by the process of the invention especially for the combination of the so-called growth and the so-called displacement for the production of alpha olefins from ethylene. Moreover, the following general advantages likewise apply to the process of the invention:

Avoidance of side reactions by distinct separation of the growth reaction and the displacement reaction by deactivating the catalysts each time after completion of the desired precursor, i.e. the aluminum trialkyls and the like, on the one hand, and the nickel compound and the like on the other; possibility of compensating for the reduction in the reaction rate by raising the temperature without the risk of an explosive course of the reaction or of side reactions having to be put up with; possibility of using the complex compounds in a manner similar to aluminum trialkyl and dialkyl aluminum halide for the production of a number of further materials such as, for example, for the production of alcohols by oxidation and hydrolysis.

Example 1

195 grams of potassium aluminum diethyl dichloride are mixed with 15 grams of aluminum triethyl and the mixture is transferred under a nitrogen atmosphere into an autoclave into which 200 grams of ethylene are then forced in under pressure. With an autoclave capacity of 1 liter, the pressure temporarily rises to 160 atmospheres when subsequently heating to 150–160° C. The pressure then decreases to 20 atmospheres during the course of 5 hours. The autoclave is now allowed to cool, the superatmospheric pressure is released and the liquid contents are discharged. The product is homogeneous and furnishes 55 grams of a mixture of olefins as a distillate when heated to 80° C. under vacuum. In this mixture, butylene, hexene, octene, and decene of which about 80% are present as straight-chain alpha olefins can be detected by gas chromatography. The residue from this distillation consists of the potassium chloride complex compound of higher aluminum alkyls having the approximate composition $K[Al[(C_2H_4)_2 \cdot {}_1C_2H_5]_2Cl_2]$.

Example 2

The procedure of Example 1 is followed except that 223 grams of the complex salt $K[Al(C_3H_7)_2Cl_2]+20$ gms. of aluminum tripropyl are used as the starting material and the reaction is carried out in an autoclave of 2 liters capacity. Upon completion of the reaction in the autoclave and release of the superatmospheric pressure 10 ml. of aluminum tripropyl which had previously been mixed with 500 mg. of nickel acetyl acetonate are introduced into the autoclave and 500 grams of liquid propylene are forced in under pressure. Heating is effected for 2 hours at 50° C. while shaking or stirring and the autoclave is then allowed to stand for a short period of time. By means of a tube extending down to the bottom of the autoclave, the liquid contents of the autoclave are allowed to flow out carefully through a valve. First, the liquid compound $K[Al(C_3H_7)_2Cl_2]$ is obtained. In the moment where the emerging liquid suddenly becomes much more mobile and a very vigorous evolution of gas occurs downstream of the valve, the latter is closed and the excess propylene still present in the autoclave is released through a valve mounted in the gas space. After the propylene has been blown off, the liquid olefins can be withdrawn from the autoclave without any difficulty. The olefin layer is of deep brown color from colloidal nickel while the complex compound withdrawn is only light yellow. It is heated for 5 hours at 180° C. and may then be re-used for a similar experiment without previous treatment. The olefin layer still contains some aluminum tripropyl which may either be deactivated by adding monopropyl aluminum dichloride before distillation of the olefins or completely destroyed by simply pouring the olefin layer into water. The olefins may then be easily processed by distillation.

Example 3

284 grams of potassium aluminum diethyl dibromide are mixed with 20 gms. of aluminum triethyl and the mixture is reacted with ethylene by the procedure of Example 1. The temperature during the growth reaction is maintained at 130–140° C. In case of the dialkyl aluminum bromides, only the complex compounds of the initial members of the series with potassium bromide are stable. When being built up to the higher compounds during the course of the addition of ethylene, they break down, as was found, with cleavage of potassium bromide and formation of the free higher dialkyl aluminum bromides. Thus, at the end of the experiment described above, the autoclave already contains some solid potassium bromide and, therefore, it is impracticable to discharge the contents of the autoclave at this stage of the experiment. Further processing may, however, be easily effected along the lines of Example 2. However, ethylene of about 50 atmospheres is used in place of propylene in the second phase. The liquid complex $$K[Al(C_2H_5)_2Br_2]$$

will then be re-formed and further working-up by the procedure of Example 2 offers no further difficulties.

What we claim is:

1. Process for the conversion of halogenous organic aluminum compounds having the general formula $KAlR_2X_2$, wherein X is selected from the group consisting of chlorine and bromine and R is a hydrocarbon radical free of unsaturated bonds on the carbon atoms bonded to the aluminum atom, into halogenous complex organic aluminum compounds of the same general formula as above but containing different hydrocarbon radicals, which comprises reacting the compound $KAlR_2X_2$ as first above defined with an olefin in the presence of a member selected from the group consisting of aluminum compounds in which the three valences are bonded to carbon atoms, alkyl aluminum hydrides, and aluminum hydride to produce said complex compound $KAlR_2X_2$ having R radicals differing from those of the starting $KAlR_2X_2$ compound.

2. Process according to claim 1, which comprises reacting said compound $KAlR_2X_2$ with ethylene at a pressure in excess of 10 atmospheres to produce substantially higher homologs of said starting compound $KAlR_2X_2$.

3. Process according to claim 2, which comprises effecting said reaction at a temperature of between 90° and 170° C.

4. Process according to claim 1, which comprises recovering said compound $KAlR_2X_2$ formed in the reaction separate from the olefins present in the reaction mixture by stratification.

5. Process according to claim 1, which comprises contacting said compound $KAlR_2X_2$ formed in the reaction with an olefin in the presence of nickel to thereby displace the hydrocarbon radicals from said compound as olefin, separating the upper layer of the reaction mixture constituting displaced olefin and nickel, and subjecting the lower layer consisting of $KAlR_2X_2$ reaction product to a further reaction with olefin.

6. Process according to claim 5, wherein said displacement is effected by means of a low molecular weight olefin.

7. Process according to claim 5, which comprises deactivating any traces of nickel present in said lower layer by heating to a temperature of 150° to 200° C. under exclusion of air.

8. Process according to claim 1, wherein said reaction is effected in the presence of aluminum trialkyl as group member.

9. Process according to claim 8, wherein said aluminum trialkyl is present in an amount of 1 to 5% of the compound $KAlR_2X_2$.

References Cited in the file of this patent

UNITED STATES PATENTS 2,889,385     Caterall et al. _____ June 2, 1959

FOREIGN PATENTS 1,034,169     Germany _____ Jan. 7, 1954

OTHER REFERENCES

"Angewandte Chemie," June 1952, pages 323 to 329.